(No Model.)
J. BROWER.
FISHING ROD.
No. 430,827. Patented June 24, 1890.
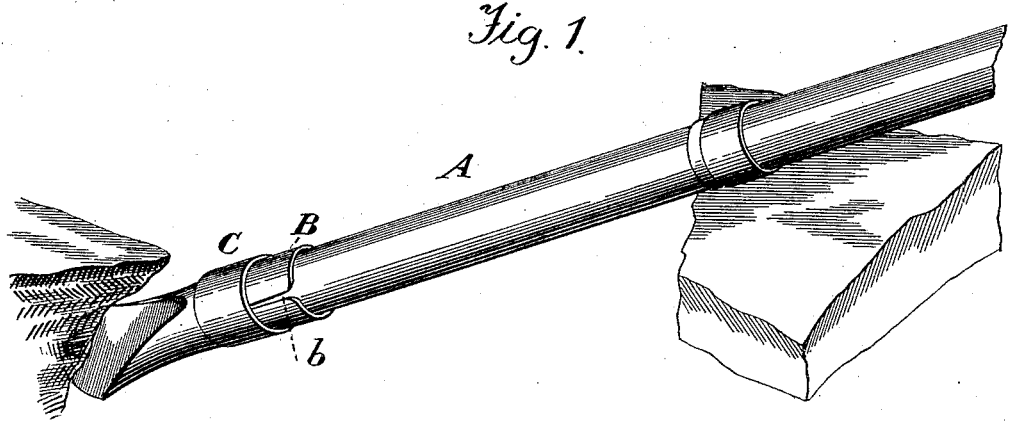
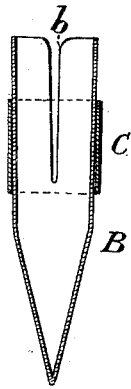
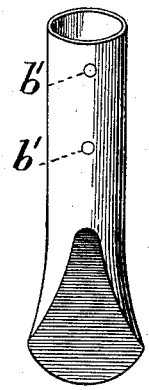
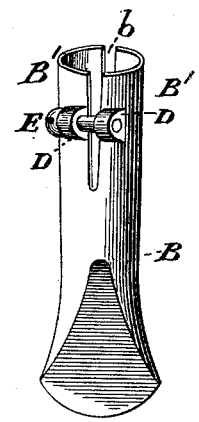
Witnesses.
A. Ruppert.
G. B. Towle.
Inventor.
Joseph Brower
Per
Thomas P. Simpson
atty

UNITED STATES PATENT OFFICE.

JOSEPH BROWER, OF LEXINGTON, KENTUCKY.

FISHING-ROD.

SPECIFICATION forming part of Letters Patent No. 430,827, dated June 24, 1890.

Application filed March 6, 1890. Serial No. 342,873. (No model.)

*To all whom it may concern:*

Be it known that I, JOSEPH BROWER, a citizen of the United States, residing at Lexington, in the county of Fayette and State of Kentucky, have invented certain new and useful Improvements in Fishing-Rods; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to provide a fishing-rod with a butt-end socket, which may be stuck in the ground and be unable to turn, so as to retain a fixed position.

The invention will first be described in connection with the drawings, and then pointed out in the claims.

Figure 1 of the drawings is a perspective view showing invention applied to a fishing-rod. Fig. 2 is a section thereof. Figs. 3 and 4 are perspective detail views of my invention in its several modifications.

In the drawings, A represents a fishing-rod provided with my butt-end socket B, secured thereto by rivets and made wedge-shaped at the end, so that it may be driven or otherwise forced into the ground, wherein it will be unable to turn by reason of its wedge shape or equivalent form. However, I preferably make the socket of spring metal, split diametrically at *b*, and provide an annular band C, which slides down until the sides spring open and receive the butt-end of the rod between them, and then are slid up, so as to clasp said sides tightly upon the rod. By this construction, which is specially intended for the finest and more expensive class of rods, the socket can be quickly put on and taken off, which is quite a desideratum with fishermen, as it may be done without injuring or disfiguring the rod.

The socket constructed, as shown in Fig. 2 of the drawings, with diametrically-opposite holes *b'*, may be permanently fastened to the rod by rivets or detachably by screws.

In Fig. 4 of the drawings I show the expanding and contractible sides or jaws B' B', clamped to the rod by means of the lugs D and screws E.

As shown in Fig. 1 of the drawings, the rod may have its socket end forced into the ground so that it cannot turn, and be supported at some part of its length by a rock or other natural object, so that the tired fisherman may rest his arm.

Having thus described all that is necessary to a full understanding of my invention, what I claim as new, and desire to protect by Letters Patent, is—

1. A fishing-rod provided with a butt-end socket having a flat or wedge-shaped end adapted to be driven into the ground and to be prevented from turning, as shown and described.

2. A fishing-rod butt-end socket split to form elastic jaws B' B' and provided with an annular band C, as and for the purpose set forth.

In testimony whereof I affix my signature in presence of two witnesses.

JOSEPH BROWER.

Witnesses:
R. AMSPIPS,
L. H. NOTTUAGOL.